United States Patent
Takahashi

[11] 4,139,264
[45] Feb. 13, 1979

[54] MINIATURIZED TELEPHOTO CAMERA LENS ASSEMBLY

[75] Inventor: Yasuo Takahashi, Tokyo, Japan

[73] Assignee: Asahi Kogaku Kogyo Kabushiki Kaisha, Tokyo, Japan

[21] Appl. No.: 827,637

[22] Filed: Aug. 25, 1977

[30] Foreign Application Priority Data

Aug. 26, 1976 [JP] Japan .................. 51/101958

[51] Int. Cl.$^2$ ............................ G02B 13/02
[52] U.S. Cl. ............................ 350/216
[58] Field of Search ................... 350/216

[56] References Cited

U.S. PATENT DOCUMENTS

| 3,467,462 | 7/1965 | Kazamaki et al. | 350/216 |
| 3,502,393 | 3/1967 | Kazamaki et al. | 350/216 |
| 4,045,128 | 8/1977 | Momiyama | 350/216 |

FOREIGN PATENT DOCUMENTS 43-3417 1968 Japan .................. 350/216

*Primary Examiner*—Conrad J. Clark
*Attorney, Agent, or Firm*—Sughrue, Rothwell, Mion, Zinn and Macpeak

[57] ABSTRACT

A telephoto lens assembly comprises a first positive lens, a second negative lens, third and fourth positive meniscus lenses having higher object side curvatures, a fifth negative lens, and a sixth positive lens adhered to the latter. The optical parameters of the lens components and assembly, including various composite focal distances, Abbe number products, and refractive index products, are chosen to satisfy prescribed, interrelated mathematical conditions to achieve satisfactory optical performance with an overall lens assembly length of less than 0.85 times the focal distance.

2 Claims, 4 Drawing Figures

MINIATURIZED TELEPHOTO CAMERA LENS ASSEMBLY

BACKGROUND OF THE INVENTION

This invention relates to a small telescopic or telephoto lens assembly having a brightness factor or f number of approximately 1:4 and a viewing field angle of less than 15 degrees.

In view of ease of operation considerations, the miniaturization of an interchangeable lens assembly for a 35 mm single lens reflex camera has a practical limit at a focal distance on the order of 200 mm. The present invention aims at the miniaturization of a telescopic lens assembly on this order, and a specific feature resides in the distance between the apex of the front lens and the image forming surface being less than 0.85 times the focal distance. This invention is a development or improvement of the invention disclosed in Japanese Patent Application Publication No. 3417/1968.

SUMMARY OF THE INVENTION

Briefly, and in accordance with the present invention, a telephoto lens assembly comprises a first positive lens, a second negative lens, third and fourth positive meniscus lenses having higher object side curvatures, a fifth negative lens, and a sixth positive lens adhered to the latter. The optical parameters of the lens components and assembly, including various composite focal distances, Abbe number products, and refractive index products, are chosen to satisfy prescribed, interrelated mathematical conditions to achieve satisfactory optical performance with an overall lens assembly length of less than 0.85 times the focal distance.

DETAILED DESCRIPTION OF THE PREFERRED EMBODIMENTS

Figure 1:
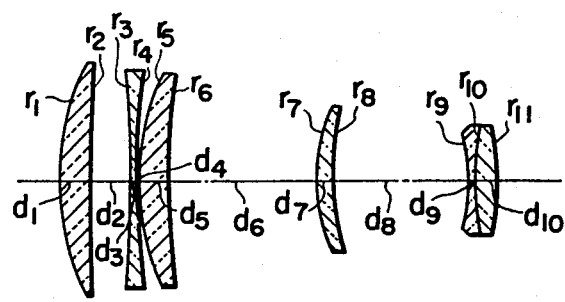
FIGS. 1 and 3 are simplified sectional diagrams illustrating small telescopic lens assemblies according to first and second examples of this invention.
Figure 2:
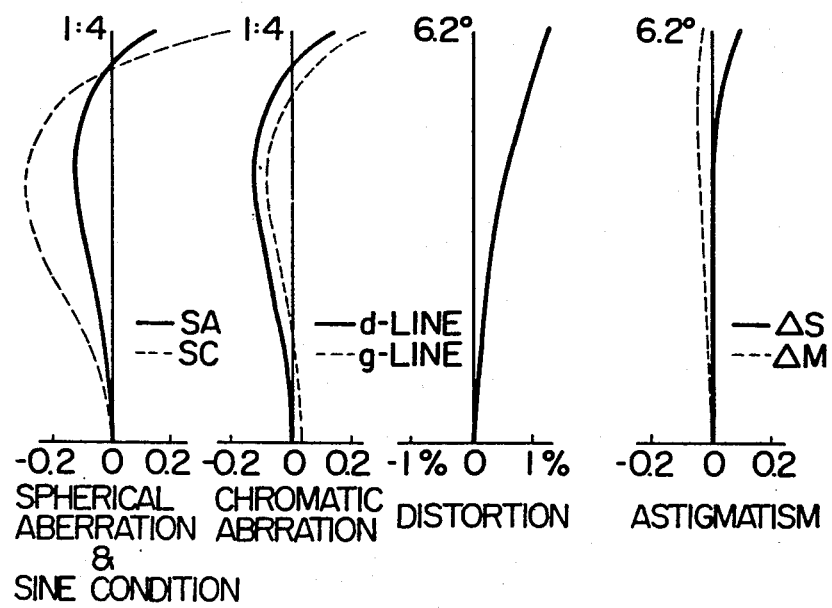
FIGS. 2 and 4 are graphical representations showing aberration curves for the first and second examples of FIGS. 1 and 3, respectively.
Figure 3:
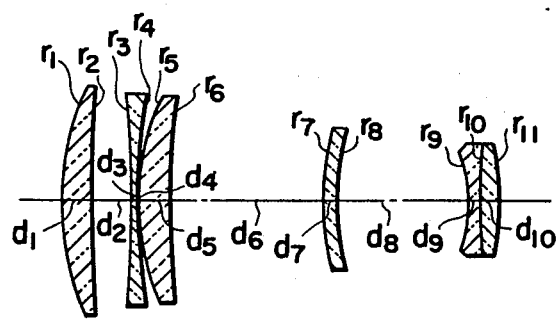
Figure 4:
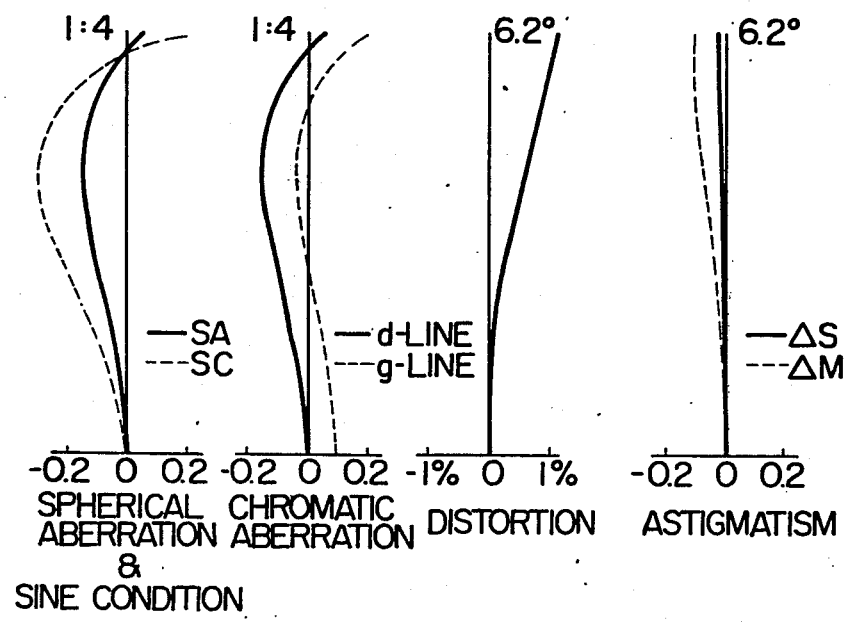

One embodiment of a small telescopic lens assembly according to this invention is shown in FIG. 1, wherein the first lens is a positive lens, the second lens is a negative lens, and the third and fourth lenses are positive meniscus lenses whose surfaces facing toward the object have a higher curvature. The fifth lens is a negative lens, and the sixth lens is a positive lens, the former being adhered to the latter to form the fifth lens group. That is, the overall lens assembly is made up of six lenses divided into five groups.

The optical parameters of the lens assembly must meet the following conditions:

(1) $F/1.8 < F_{1.2.3} < F/1.2$,
(2) $F/2.3 < F_{1.2.3.4} < F/1.8$,
(3) $58 < \nu_1 \cdot \nu_3$,
(4) $\nu_2 < 30$,
(5) $55 < \nu_4 \cdot n_4 < 1.55$,
(6) $|n_5 - n_6| < 0.1$, and
(7) $1.65 < n_5 \cdot n_6$, wherein:

F is the focal distance of the overall lens system, $F_{1.2...j}$ is the composite focal distance of the first through the j-th lenses, $n_i$ is the refractive index at the d or surface distance line of the i-th lens, and $\nu_i$ is the Abbe's number of the i-th lens.

Condition (1) is one of the miniaturization criteria for the lens assembly, and is closely associated with condition (2).

When $F_{1.2.3}$ is longer than $F/1.2$, such excess length must be compensated for in the fourth lens to preserve miniaturization. Minimizing the decrease in astigmatism of the seventh surface will increase the positive astigmatism of the eighth surface, however, and this is not optically suitable or acceptable. When $F_{1.2.3}$ is shorter than $F/1.8$ the object of miniaturization may be achieved, but the Petzval's sum will be decreased and it is difficult to limit the color aberration of the first through the third lenses to an acceptable value.

Condition (2) is also required for miniaturization, and determines the power of the fourth lens in relation to condition (1). When $F_{1.2.3.4}$ is shorter than $F/2.3$, the requirements for the fourth lens become excessive which may lead to the above-described astigmatism drawback and to a decrease in the Petzval's sum. If the glass material of the fifth and sixth lenses is selected to prevent such a decrease in the Petzval's sum, then condition (7) will be difficult to meet. In contrast, when $F_{1.2.3.4}$ is longer than $F/1.8$, it is impossible to achieve miniaturization. The telescopic ratio may be increased by increasing the value of $d_8$, but this leads to a decrease in the Petzval's sum.

Condition (3) establishes a suitable color aberration level for the first through the third lenses in association with condition (4). When the $\nu$ value of the first and third lenses is less than 58, the color aberration can be maintained at a suitable level by increasing the power of the second lens, but this results in a decrease in the Petzval's sum. Therefore, to minimize the power of the second lens to maintain a suitable balance with the other aberrations, it is necessary to make $\nu_2$ smaller than 30. Condition (3) is thus required for the Abbe's numbers $\nu_1$ and $\nu_3$ of the positive lenses, whereas condition (4) is required for the Abbe's number $\nu_2$ of the negative lens.

Condition (5) is one of the specific features of this invention. In general, when the focal distance is shorter than $F/1.8$ in condition (2) to increase the telescopic ratio, the distance $d_8$ must be relatively short to prevent a decrease in the Petzval's sum, and the material of the fourth lens glass must not have a low refractive index. This increases the negative astigmatism of the seventh surface and prevents an increase in the positive astigmatism of the eighth surface, however, as disclosed in Japanese Patent Application Publication No. 3417/1968. Acknowledging this drawback, the present invention employs glass material having a low refractive index to prevent a decrease in the Petzval's sum and achieve the miniaturization object. As the distance $d_8$ is made relatively long, the color aberration correction is liable to be insufficient. Therefore, it is desirable for the fourth lens to have a large Abbe's number $\nu$, as required by condition (5).

Condition (6) prevents aberration at the interface between the fifth and sixth lenses. The adhesion of the fifth and sixth lenses balances the color aberration. When these lenses have different refractive indices, i.e. when $n_5 < n_6$, the distortion of the image tends to increase in a positive direction. In contrast, when $n_5 < n_6$, an effect similar to that encountered in controlling the coma aberration in all the surfaces after the seventh one is liable to take place, which disrupts the balance with the other surfaces. It is therefore desirable that there be substantially no difference in refractive index between the fifth and sixth lenses, and condition (6) establishes the absolute value of such difference at less than 0.1.

Condition (7) prevents a decrease in the Petzval's sum, and makes it preferable to use glass having a high refractive index for the fifth and sixth lenses. If $n_5 \cdot n_6$ is less than 1.65, the power of the fifth and sixth lens assembly will become negative, and it will be difficult to prevent an increase in the distortion which takes place at the eleventh surface.

Specific optical parameters for two telephoto lens assemblies according to this invention are presented below as non-limiting examples, wherein:

$r_j$ is the j-th radius of curvature,
$d_k$ is the k-th surface distance,
$\Sigma_p$ is the Petzval's sum, and
$\omega$ is the half-viewing field angle.

Example 1

| $F = 100mm, f = 1:4.0, \omega = \pm 6.2°$ | | |
|---|---|---|
| $r_1 = 29.87$ | $d_1 = 3.53$ | $n_1/\nu_1 = 1.51633/64.1$ |
| $r_2 = 215.57$ | $d_2 = 4.20$ | |
| $r_3 = -195.99$ | $d_3 = 1.03$ | $n_2/84_2 = 1.76182/26.6$ |
| $r_4 = 90.38$ | $d_4 = 0.05$ | |
| $r_5 = 28.32$ | $d_5 = 3.27$ | $n_3/\nu_3 = 1.51633/64.1$ |
| $r_6 = 76.39$ | $d_6 = 16.58$ | |
| $r_7 = 20.96$ | $d_7 = 1.75$ | $n_4/\nu_4 = 1.51874/64.5$ |
| $r_8 = 26.26$ | $d_8 = 14.80$ | |
| $r_9 = -13.39$ | $d_9 = 1.00$ | $n_5/\nu_5 = 1.76200/40.2$ |
| $r_{10} = 308.99$ | $d_{10} = 2.06$ | $n_6/\nu_6 = 1.80518/25.4$ |
| $r_{11} = -26.98$ | | |

$$F_{1.2.3} = F/1.449 = 69.0$$
$$F_{1.2.3.4} = F/1.818 = 55.0$$
$$\Sigma_p = -0.20$$

Example 2

| $F = 100mm, f = 1:4.0, \omega = \pm 6.2°$ | | |
|---|---|---|
| $r_1 = 29.91$ | $d_1 = 3.53$ | $n_1/\nu_1 = 1.51633/64.1$ |
| $r_2 = 215.86$ | $d_2 = 4.20$ | |
| $r_3 = -196.26$ | $d_3 = 1.03$ | $n_2/\nu_2 = 1.76182/26.6$ |
| $r_4 = 90.50$ | $d_4 = 0.05$ | |
| $r_5 = 28.36$ | $d_5 = 3.27$ | $n_3/\nu_3 = 1.51633/64.1$ |
| $r_6 = 76.49$ | $d_6 = 16.61$ | |
| $r_7 = 26.69$ | $d_7 = 1.75$ | $n_4/\nu_4 = 1.51633/64.1$ |
| $r_8 = 36.87$ | $d_8 = 14.34$ | |
| $r_9 = -14.18$ | $d_9 = 1.44$ | $n_5/\nu_5 = 1.76200/40.2$ |
| $r_{10} = 154.71$ | $d_{10} = 2.06$ | $n_6/\nu_6 = 1.76182/26.6$ |
| $r_{11} = -27.07$ | | |

$$F_{1.2.3} = F/1.449 = 69.0$$
$$F_{1.2.3.4} = F/1.815 = 55.1$$
$$\Sigma_p = 31\ 0.06$$

What is claimed is:

1. A miniaturized telephoto camera lens assembly, comprising: in order, a first positive lens, a second negative lens, third and fourth positive meniscus lenses each of whose object side surfaces has a higher curvature than the image side surface, a fifth negative lens, and a sixth positive lens, said fifth and sixth lenses being adhered to each other, and said lens assembly satisfying the following conditions:

(1) $F/1.8 < F_{1.2.3} < F/1.2$,
(2) $F/2.3 < F_{1.2.3.4} < F/1.8$,
(3) $58 < \nu_1 \cdot \nu_3$,
(4) $\nu_2 < 30$,
(5) $55 < \nu_4 \cdot n_4 < 1.55$,
(6) $|n_5 - n_6| < 0.1$,
(7) $1.65 < n_5 \cdot n_6$, and
(8) overall length $< 0.85F$, wherein:
F is the focal distance of the overall lens assembly,
$F_{1.2\ldots i}$ is the composite focal distance of the first through the i-th lenses,
$n_i$ is the refractive index at the surface distance line of the i-th lens, and
$\nu_i$ is the Abbe's number of the i-th lens, and

| $F = 100mm, f = 1:4.0, \omega = \pm 6.2°$ | | |
|---|---|---|
| $r_1 = 29.87$ | $d_1 = 3.53$ | $n_1/\nu_1 = 1.51633/64.1$ |
| $r_2 = 215.57$ | $d_2 = 4.20$ | |
| $r_3 = -195.99$ | $d_3 = 1.03$ | $n_2/\nu_2 = 1.76182/26.6$ |
| $r_4 = 90.38$ | $d_4 = 0.05$ | |
| $r_5 = 28.32$ | $d_5 = 3.27$ | $n_3/\nu_3 = 1.51633/64.1$ |
| $r_6 = 76.39$ | $d_6 = 16.58$ | |
| $r_7 = 20.96$ | $d_7 = 1.75$ | $n_4/\nu_4 = 1.51874/64.5$ |
| $r_8 = 26.26$ | $d_8 = 14.80$ | |
| $r_9 = -13.39$ | $d_9 = 1.00$ | $n_5/\nu_5 = 1.76200/40.2$ |
| $r_{10} = 308.99$ | $d_{10} = 2.06$ | $n_6/\nu_6 = 1.80518/25.4$ |
| $r_{11} = -26.98$ | | |

$$F_{1.2.3} = F/1.449 = 69.0$$
$$F_{1.2.3.4} = F/1.818 = 55.0$$
$$\Sigma_p = -0.20$$

wherein:
$r_j$ is the j-th radius of curvature,
$d_k$ is the k-th surface distance,
$\Sigma_p$ is the Petzval's sum, and
$\omega$ is the half-viewing field angle.

2. A miniaturized telephoto camera lens assembly, comprising: in order, a first positive lens, a second negative lens, third and fourth positive meniscus lenses each of whose object side surfaces has a higher curvature than the image side surface, a fifth negative lens, and a sixth positive lens, said fifth and sixth lenses being adhered to each other, and said lens assembly satisfying the following conditions:

(1) $F/1.8 < F_{1.2.3} < F/1.2$,
(2) $F/2.3 < F_{1.2.3.4} < F/1.8$,
(3) $58 < \nu_1 \cdot \nu_3$,
(4) $\nu_2 < 30$,
(5) $55 < \nu_4 \cdot n_4 < 1.55$,
(6) $|n_5 - n_6| < 0.1$,
(7) $1.65 < n_5 \cdot n_6$, and
(8) overall length $< 0.85F$, wherein:
F is the focal distance of the overall lens assembly,
$F_{1.2\ldots i}$ is the composite focal distance of the first through the i-th lenses,
$n_i$ is the refractive index at the surface distance line of the i-th lens, and
$\nu_i$ is the Abbe's number of the i-th lens, and

| $F = 100mm, f = 1:4.0, \omega = \pm 6.2°$ | | |
|---|---|---|
| $r_1 = 29.91$ | $d_1 = 3.53$ | $n_1/\nu_1 = 1.51633/64.1$ |
| $r_2 = 215.86$ | $d_2 = 4.20$ | |
| $r_3 = -196.26$ | $d_3 = 1.03$ | $n_2/\nu_2 = 1.76182/26.6$ |
| $r_4 = 90.50$ | $d_4 = 0.05$ | |
| $r_5 = 28.36$ | $d_5 = 3.27$ | $n_3/\nu_3 = 1.51633/64.1$ |
| $r_6 = 76.49$ | $d_6 = 16.61$ | |
| $r_7 = 26.69$ | $d_7 = 1.75$ | $n_4/\nu_4 = 1.51633/64.1$ |
| $r_8 = 36.87$ | $d_8 = 14.34$ | |
| $r_9 = -14.18$ | $d_9 = 1.44$ | $n_5/\nu_5 = 1.76200/40.2$ |
| $r_{10} = 154.71$ | $d_{10} = 2.06$ | $n_6/\nu_6 = 1.76182/26.6$ |
| $r_{11} = -27.07$ | | |

$$F_{1.2.3} = F/1.449 = 69.0$$
$$F_{1.2.3.4} = F/1.815 = 55.1$$
$$\Sigma_p = -0.06$$

wherein:
$r_j$ is the j-th radius of curvature,
$d_k$ is the k-th surface distance,
$\Sigma_p$ is the Petzval's sum, and
$\omega$ is the half-viewing field angle.

* * * * *